US009699875B2

(12) United States Patent
Mueller et al.

(10) Patent No.: US 9,699,875 B2
(45) Date of Patent: Jul. 4, 2017

(54) DLP PROJECTOR AND METHOD FOR PROJECTING AT LEAST ONE IMAGE ONTO A PROJECTION SURFACE

(71) Applicant: OSRAM GmbH, Munich (DE)

(72) Inventors: Juergen Mueller, Berlin (DE); Norbert Magg, Berlin (DE)

(73) Assignee: OSRAM GmbH, Munich (DE)

( * ) Notice: Subject to any disclaimer, the term of this patent is extended or adjusted under 35 U.S.C. 154(b) by 260 days.

(21) Appl. No.: 14/367,249

(22) PCT Filed: Dec. 19, 2012

(86) PCT No.: PCT/EP2012/076214
§ 371 (c)(1),
(2) Date: Jun. 20, 2014

(87) PCT Pub. No.: WO2013/092750
PCT Pub. Date: Jun. 27, 2013

(65) Prior Publication Data
US 2014/0340656 A1    Nov. 20, 2014

(30) Foreign Application Priority Data

Dec. 22, 2011 (DE) ......................... 10 2011 089 592

(51) Int. Cl.
*G03B 21/20*    (2006.01)
*H04N 9/31*    (2006.01)
*H05B 41/288*    (2006.01)

(52) U.S. Cl.
CPC ....... *H05B 41/2887* (2013.01); *H04N 9/3114* (2013.01); *H04N 9/3155* (2013.01);
(Continued)

(58) Field of Classification Search
CPC   G03B 21/2026; G03B 21/2053; G03B 21/20; H04N 9/3155; H05B 37/02; H05B 37/0281; H05B 33/0815; Y02B 20/202
(Continued)

(56) References Cited

U.S. PATENT DOCUMENTS 6,586,892 B2    7/2003 Derra et al.
7,443,103 B2    10/2008 Li et al.
(Continued)

FOREIGN PATENT DOCUMENTS

DE    102007057772 A1    6/2008
DE    102009006338 A1    9/2010
(Continued)

OTHER PUBLICATIONS

W Schlager et al. "A novel experimental method for in situ diagnostics of electrode workfunctions in high-pressure gas discharge lamps during operation", Journal of Physics D: Applied Physics, 33, 2000, pp. 3083-3093.
(Continued)

*Primary Examiner* — William C Dowling
*Assistant Examiner* — Ryan Howard
(74) *Attorney, Agent, or Firm* — Viering, Jentschura & Partner mbB

(57) ABSTRACT

Various embodiments relates to a DLP (digital light processing) projector for projecting at least one image on a projection surface. A discharge lamp is driven by a current waveform having at least one first region, to which a first frequency is assigned, and a second region, to which a second frequency is assigned, wherein the first region is established by a first commutation and a following second commutation, wherein the second region is established by the region between the second commutation and a following first commutation, wherein further commutations can occur
(Continued)

within the second region, wherein a modulation factor is defined by the ratio of second frequency to first frequency, wherein the modulation factor is at least 3. A method for projecting at least one image is also disclosed.

9 Claims, 3 Drawing Sheets

(52) U.S. Cl.
CPC ...... *G03B 21/2026* (2013.01); *G03B 21/2053* (2013.01); *Y02B 20/202* (2013.01)

(58) Field of Classification Search
USPC .............................. 353/85, 84; 315/291, 307
See application file for complete search history.

(56) References Cited

U.S. PATENT DOCUMENTS

| 8,384,296 | B2* | 2/2013 | Hirao | ................ | H05B 41/2887 |
| | | | | | 315/224 |
| 8,602,566 | B2 | 12/2013 | Baier et al. | | |
| 2005/0206326 | A1 | 9/2005 | Suzuki et al. | | |
| 2008/0246926 | A1 | 10/2008 | Deppe | | |
| 2009/0200954 | A1 | 8/2009 | Li et al. | | |
| 2010/0033692 | A1 | 2/2010 | Watanabe et al. | | |
| 2011/0221356 | A1 | 9/2011 | Saka et al. | | |
| 2011/0310361 | A1 | 12/2011 | Brueckel et al. | | |
| 2013/0134899 | A1 | 5/2013 | Magg | | |

FOREIGN PATENT DOCUMENTS

| DE | 102009006339 | A1 | 9/2010 |
| DE | 102010039221 | A1 | 2/2012 |
| EP | 0224980 | A1 | 6/1987 |
| EP | 1549114 | A1 | 6/2005 |
| EP | 1624733 | A2 | 2/2006 |
| WO | 2004107823 | A2 | 12/2004 |
| WO | 2009007914 | A1 | 1/2009 |

OTHER PUBLICATIONS

International Search Report issued in the corresponding PCT application No. PCT/EP2012/076214, dated Mar. 21, 2013.
English abstract of DE 102007057772 A1 of Jun. 19, 2008.
Office Action issued in the corresponding German application No. 10 2011 089 592.2, dated Aug. 2, 2012.

* cited by examiner

DLP PROJECTOR AND METHOD FOR PROJECTING AT LEAST ONE IMAGE ONTO A PROJECTION SURFACE

RELATED APPLICATIONS

The present application is a national stage entry according to 35 U.S.C. §371 of PCT application No.: PCT/EP2012/076214 filed on Dec. 19, 2012, which claims priority from German application No. 10 2011 089 592.2 filed on Dec. 22, 2011, and is incorporated herein by reference in its entirety.

TECHNICAL FIELD

Various embodiments relate to a DLP (digital light processing) projector for projecting at least one image onto a projection surface, including at least one discharge lamp, a color wheel having a predefinable number of color segments, and a control device for activating the discharge lamp, wherein the control device is designed to activate the discharge lamp such that the at least one image is projected with a predefinable repetition rate onto the projection surface, wherein the control device is furthermore designed to activate the discharge lamp using a current waveform which includes at least one current increase to implement a maintenance pulse, wherein the current waveform furthermore includes at least one first region, to which a first frequency is assigned, and a second region, to which a second frequency is assigned. The first region is established by a first commutation and a following second commutation, while in contrast the second region is established by the region between a second commutation and a following first commutation. The first frequency is calculated as $f_1=1/(2*T1)$, wherein T1 relates to the period of time between the first and the second commutation. The second frequency is calculated as $$f_2 = n \Big/ \Big(2 * \sum_{i=1}^{n} T_i\Big),$$

wherein
$T_i$ relates to the periods of time from one commutation to the next commutation within the second region and n denotes the number of such periods of time within the second region. A modulation factor is defined by the ratio of the second frequency to the first frequency. The present disclosure additionally relates to a corresponding method for projecting at least one image onto a projection surface by means of a DLP projector.

BACKGROUND

Gas discharge lamps, as are used, for example, for video projection applications, contain a pair of electrodes made of tungsten as an essential feature. In the case of a suitable operating mode, small tips grow on these electrodes, which are used as a starting point for the discharge arc. Such tips have an advantageous effect on the performance of the lamp, in particular with regard to higher luminance, lower tendency to flicker, and lower tendency to burn back.

A stabilization of the tips is accordingly of great significance to implement the above-mentioned advantages. The requirement is to keep stable both the geometry and also the position of the tips on the electrode head, and to do so over the entire service life of the lamp. An electrode reaches temperatures in the vicinity of the melting point of tungsten during the lamp operation on its frontmost end facing toward the discharge arc. For this reason, material is continuously vaporized from the tip. This vaporized material must be supplied to the electrode tip again by a suitable operating mode from the front region of the electrode head.

In addition to these requirements for the electrode stabilization, the lamp operating mode must be closely adapted to the predefined customer applications. In particular in DLP projectors, precise synchronization with the color wheel conventionally used therein must occur. FIG. 1 shows in this context a typical color wheel 10 used in DLP projectors, which in the present case has six different color segments 12a to 12f. As can be inferred from the illustration in FIG. 1, the individual color segments, which are assigned different colors, can have different lengths. In addition, a modulation of the lamp current level synchronized with the color wheel (Unishape principle) is used as a standard feature in present DLP projectors, which results in an improvement of the useful light with regard to maximum achievable brightness, quality of the color reproduction, or white balance.

The current-over-time curves I(t), which have heretofore been used for operating the discharge lamps, and which are also referred to as "current waveform" hereafter, are generally concentrated on the requirements with respect to the modulation of the current level, i.e., with respect to the above-mentioned improvement of the useful light. A chronological modulation, corresponding to a frequency modulation, was heretofore avoided as much as possible. Different current waveform patterns result depending on the color wheel type, in particular depending on the number and the length of the color segments, and its rotation speed, which is typically 120 Hz or 180 Hz. The number and position of the current commutations is conventionally selected so that the resulting current waveform is as symmetrical as possible and a mean lamp frequency of 50 Hz to 90 Hz results. A commutation device is conventionally used for the commutation, which frequently consists of electronic switches, which commutate the polarity of the direct current source in the cycle of the rectangular lamp current, as described in greater detail in DE 10 2007 057 772 A1, for example. During the commutation, overshoots cannot be completely avoided in practice. Therefore, the moment at which a commutation is to occur is generally overlaid with the moment at which the color of the light changes to blank out the overshoots. (One exception from this procedure is, for example, a white segment, in which commutation can also be performed within the segment). For this purpose, as described above, a sync signal is provided, which has a sync pulse in synchronization with the color wheel. With the aid of the sync signal, the color change and the commutation of the lamp current are synchronized.

FIG. 2 shows in this context a typical current waveform known from the related art for the color wheel 10 shown in FIG. 1 having six segments and a rotation frequency of 180 Hz. This corresponds to three rotations of the color wheel 10 per image, wherein the image is projected at a repetition rate (frame rate) of 60 Hz. Three commutations were set per image repetition, from which a mean lamp frequency of 90 Hz results. In the case of the current waveform shown in FIG. 2, the position of the commutations was selected so that the resulting current waveform is symmetrical and is therefore free of direct current.

The respective current increase occurring before a commutation in the current waveform, for example, is referred to as a so-called maintenance pulse (see, for example, U.S. Pat. No. 6,586,892 B2) MP. This ensures stronger melting of the respective electrode operating as an anode in the front region, which is then drawn together by the surface tension of the tungsten and cools again after the subsequent commutation. If this method is repeated at corresponding time intervals, a tip slowly forms therefrom. The maintenance pulse is preferably to be before the commutation for effective application in this case.

In a current waveform, furthermore sections which are assigned to specific segments of the color wheel 10 can be increased according to the Unishape principle. Different segments come into consideration in this case depending on the target to be implemented.

For example, if very good brightness is to be achieved, the bright section or sections of the current waveform are increased. If a good color reproduction is to be implemented, the segments are increased which are present less in the spectrum of the discharge lamp, for example, blue or red. In the current waveform shown in FIG. 2, a corresponding current pulse SP is shown as an example.

Since the mean power is predefined independently of the existing current pulses SP or maintenance pulses MP, the amplitude of other regions of the current waveform is to be reduced when current increases SP or MP are provided. An increase SP extends over an entire segment 12, because of which a current waveform is to be designed for a specific color wheel.

The current waveform shown in FIG. 3, which is known from the related art, was also generated for the color wheel 10 shown in FIG. 1. Only two commutations were set per image repetition here, however, from which a mean lamp frequency of 60 Hz results. The position of the commutations was again selected in this case so that the resulting current waveform is symmetrical. In the case of the current waveform shown in FIG. 3, it is to be considered that SP1 becomes an MP in the next half wave, which is then subjected to a commutation after this current increase. In principle, there are only two different current increases: a short one of 0.63 ms length and a long one of 1.28 ms length. Depending on whether or not a commutation follows, it is an MP or just a simple current increase SP.

The current waveforms shown in FIG. 2 and FIG. 3 fulfill the specifications of a DLP projector producer with respect to the useful light. Nonetheless, undesired electrode burning back is displayed upon the use of both current waveforms, so that only a comparatively short service life can be expected.

FIG. 4 shows a further current waveform known from the related art. It has a region 1, in which the illustrated half wave is 8.33 ms long. The associated full wave would accordingly be 16.67 ms long. The first frequency is accordingly 60 Hz in the present case. In the region 2, the first half wave is 4.40 ms long, and the associated full wave would be 8.80 ms long. The frequency is accordingly 1/8.80 ms=113.60 Hz. The second half wave in the region 2 is 3.94 ms long. The associated full wave would accordingly be 7.88 ms. The frequency would accordingly be 127 Hz. The modulation factor, calculated from the ratio of the mean frequency of the second region, the so-called second frequency, to the first frequency, is accordingly 2.0.

Such a current waveform accordingly has a moderate modulation factor and results from necessity, because no other matching commutation pattern was feasible for the color wheel predefined in FIG. 1.

A further current waveform having a modulation factor not equal to 1 is known from DE 10 2010 039 221 A1, which was published later, see FIG. 2b therein. A modulation factor calculated according to the algorithm mentioned at the outset is 2.2 for the current waveform shown therein.

An operation of a DLP projector using a current waveform according to FIG. 4 does not show any significant improvement with respect to tendency to burn back and stabilization of the electrode tip position in comparison to the current waveforms shown in FIG. 2 and FIG. 3, unfortunately. This will be discussed in greater detail hereafter with reference to FIGS. 6 and 7.

SUMMARY

Various embodiments relate to a DLP projector according to the species or a method according to the species such that a reduced tendency to burn back and an improved stabilization of the electrode tip position are enabled.

The present disclosure is based on the finding that this object may be achieved in a completely surprising manner if the first and second frequencies, as defined at the outset, differ from one another such that a modulation factor results which is at least 3. While current waveforms having a modulation factor less than 3, see, for example, the above statements on the current waveform shown in FIG. 4, do not have any noticeable positive effects with respect to luminance, tendency to flicker, and tendency to burn back, this changes suddenly as soon as a modulation factor of 3 is exceeded. The actual cause of this behavior has not yet been definitively explained. The inventors of the present disclosure are of the opinion at the present point in time that melting and cooling phases of the electrode tips, which are repeated during a selection of the modulation factor according to the present disclosure, synergistically build up to an effect which results in a previously unknown stabilization of the electrode tips. It is presently suspected that in the case of modulation factors less than 3, no synergistic effect can result, since the chronological durations of the respective melting and cooling phases are not optimally adapted to one another and therefore a suitably high modulation of the electrode temperature cannot be achieved.

Furthermore, it is suspected that the combination of a modulation factor according to the present disclosure with an additional modulation of the current strengths within a half wave results in the effect that an additional modulation of the electrode tip temperature can be achieved. Conditions which, in contrast to the already known waveforms, see, for example, FIG. 4 in the appendix or FIG. 2b of DE 10 2010 039 221 A1, lead to an improvement of the stability of the electrode tips to a previously unknown extent, first result through the combination of frequency modulation and current level modulation. It is advantageously possible to achieve a required modulation of the electrode temperature by various combinations of frequency and current level modulations, whereby more flexibility results in the adaptation to a concrete color wheel.

By means of a current waveform according to the disclosure, on the one hand, a reduction of the electrode burning back and, on the other hand, a stabilization of the tip position may be caused. Specifically, as mentioned above, a temperature modulation is also induced in the region of the electrode tip by the frequency modulation, which improves the transport of tungsten from the electrode head into the electrode tip. It is decisive in this case that the current waveform according to the present disclosure has advantages with respect to the stabilization of the tip position, because in comparison to the current waveforms known from the related art, only very small regions around the electrode tip are activated for the tungsten transport.

As a result, a significantly improved voltage curve and a lamp service life, which can be increased by more than 50% in relation to the related art, may be achieved by means of current waveforms according to the present disclosure.

In relevant tests, it has been found that the advantageous effects result in particular when the modulation factor is at most 8. It is suspected that at a modulation factor greater than 8, suitably high thermal modulation of the electrodes may no longer be achieved. The mean value of the first and the second frequencies is preferably between 30 Hz and 270 Hz, preferably between 45 Hz and 180 Hz. If the frequencies are greater than this, the advantages of the present disclosure may not be implemented.

The maintenance pulse is particularly preferably located at the end of the first region. Because the maintenance pulse is located at the end of the first region, the electrode tip, which is in the anodic state, is additionally heated and therefore its thermal modulation is increased. The first region is to have a time length between 5 ms and 25 ms in this case. The first region is particularly preferably between 8 ms and 20 ms long.

In a preferred embodiment, the DLP projector furthermore has a voltage measuring device, which is designed to determine a value correlated with the arc voltage of the discharge lamp, wherein the control device is coupled to the voltage measuring device, wherein the control device is designed, if it is established that the value correlated with the arc voltage falls below a predefinable threshold value, to modify the current waveform such that the modulation factor is at most 2.5. Further growing together of the electrodes and a risk linked thereto of underload operation is avoided by this measure. A reduction of the modulation factor can be achieved in that commutations, in particular in the second region, are omitted or commutations are added in the first region.

The DLP projector may furthermore include a power determination device, which is designed to determine a value correlated with the power implemented in the discharge lamp, wherein the power determination device is coupled to the control device, wherein the control device is furthermore designed, if it is established that the value correlated with the power implemented in the discharge lamp falls below a predefinable threshold value, to modify the current waveform such that the modulation factor is decreased. A reduction of the modulation factor in the case of a lamp operation at a power which is significantly less than the nominal power, for example, less than 80% of the nominal power, reduces the risk of underload operation similarly to the above-described voltage-controlled reduction of the modulation factor. This measure is necessary since in the case of lamp operation with reduced power, an additional tendency for tip growth is frequently observed.

Further advantageous embodiments result from the dependent claims.

The preferred embodiments presented with reference to a DLP projector according to the present disclosure and the advantages thereof apply accordingly, if applicable, to the method according to the present disclosure.

BRIEF DESCRIPTION OF THE DRAWING(S)

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

Figure 1:
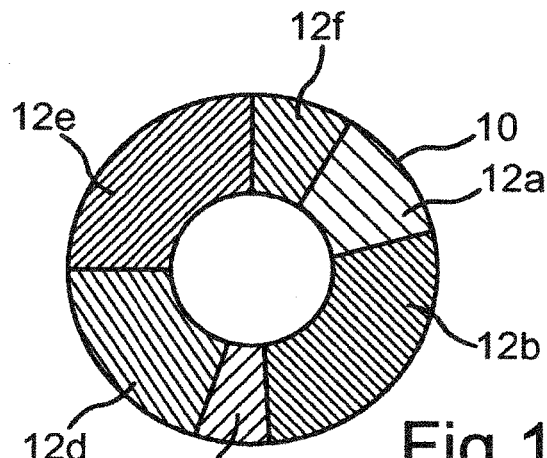
FIG. 1 shows a schematic illustration of a color wheel known from the related art, as can be used in a DLP projector.
Figure 2:
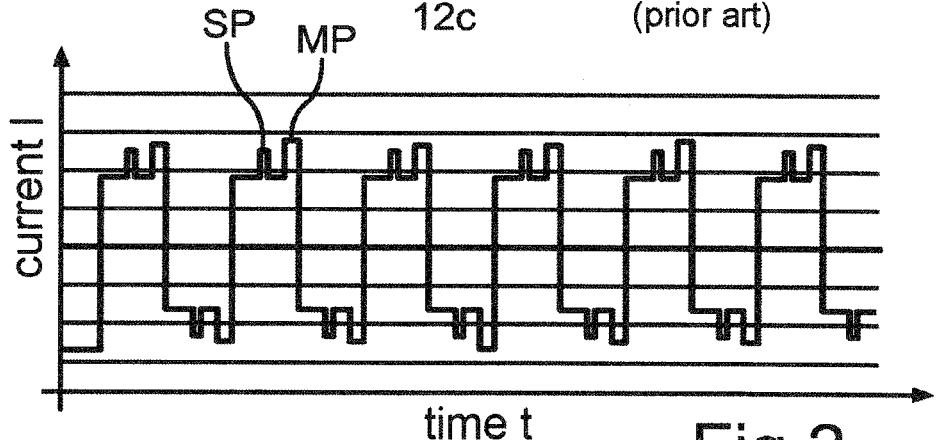
FIG. 2 shows a schematic illustration of a first current waveform, which is known from the related art, for operating the discharge lamp of a DLP projector.
Figure 3:
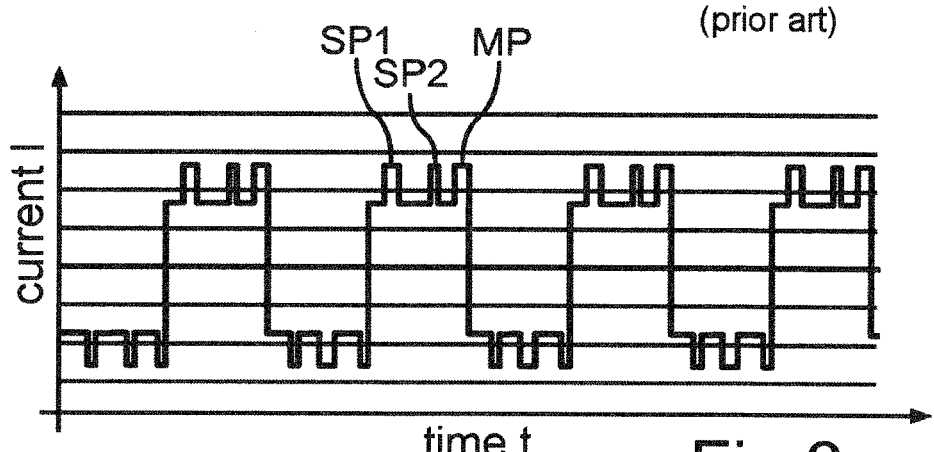
FIG. 3 shows a schematic illustration of a second current waveform, which is known from the related art, for operating the discharge lamp of a DLP projector.
Figure 4:
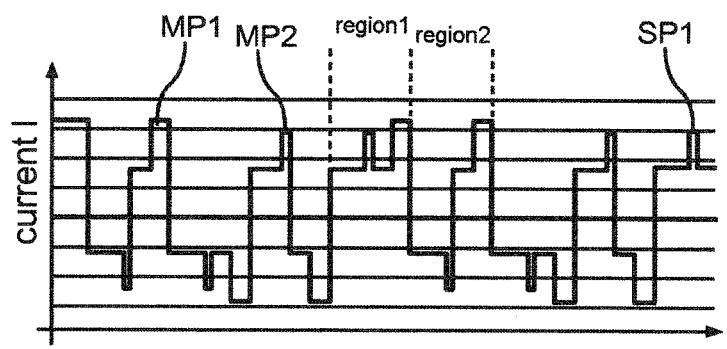
FIG. 4 shows a schematic illustration of a third current waveform, which is known from the related art, for operating the discharge lamp of a DLP projector.
Figure 5:
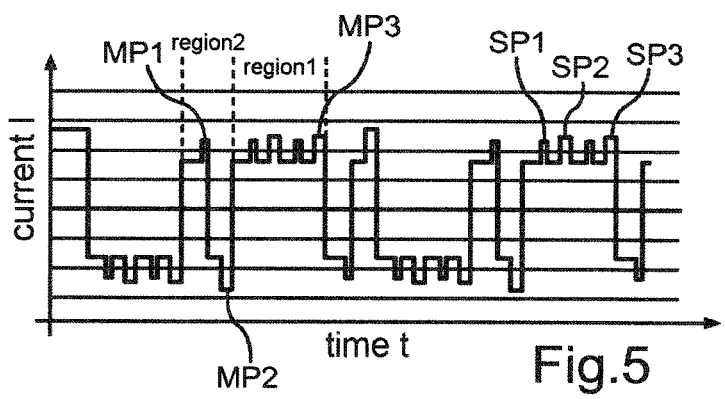
FIG. 5 shows a schematic illustration of an exemplary embodiment of a current waveform according to the present disclosure for operating the discharge lamp of a DLP projector.
Figure 6:
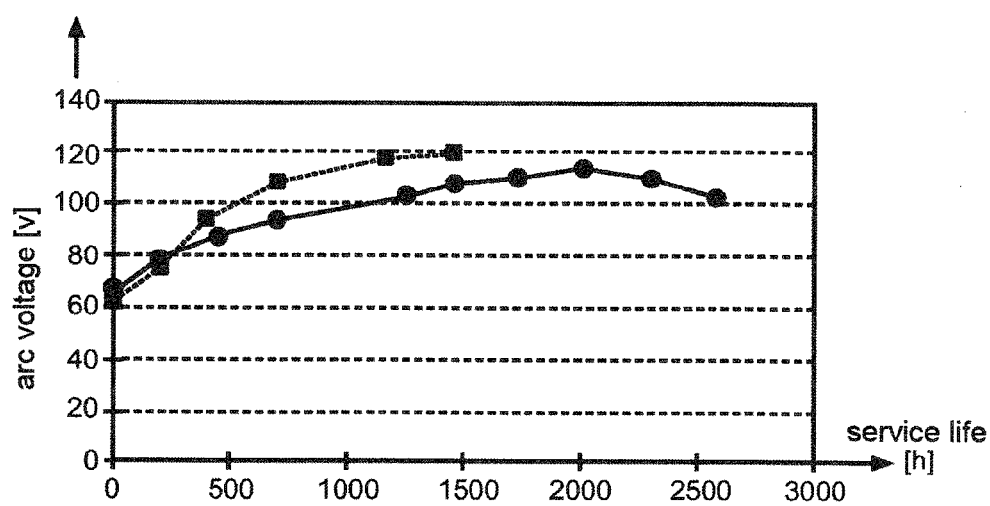
Figure 7:
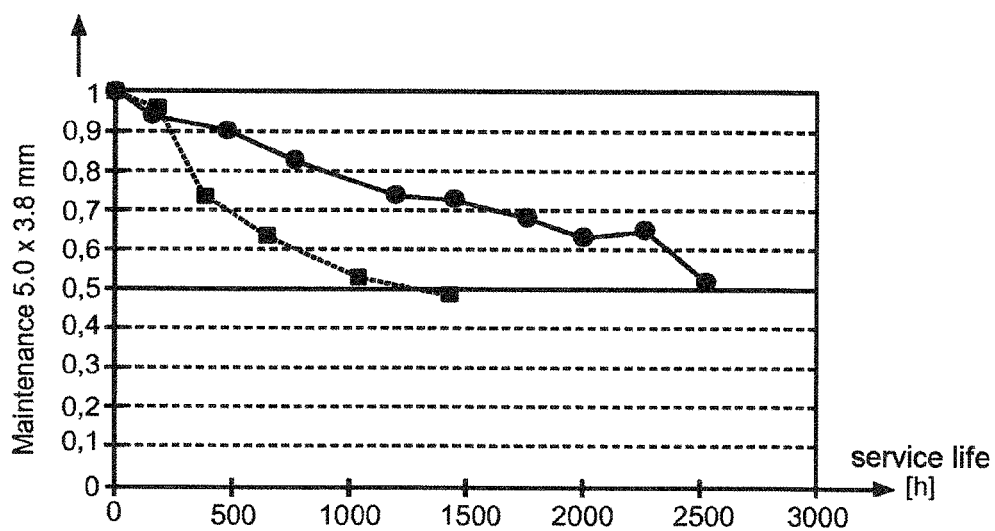

FIG. 6 shows the curve of the mean arc voltage over the service life of an ensemble made of respectively ten discharge lamps in the case of operation using a current waveform according to FIG. 4 (dashed line) and in the case of operation using a current waveform according to FIG. 5 (solid line); and FIG. 7 shows the curve of the mean maintenance in the case of operation of an ensemble made of respectively ten discharge lamps using a current waveform according to FIG. 4 (dashed line) and in the case of operation using a current waveform according to FIG. 5 (solid line).

DETAILED DESCRIPTION

The following detailed description refers to the accompanying drawing that show, by way of illustration, specific details and embodiments in which the disclosure may be practiced.

FIG. 5 shows an embodiment of a current waveform as is applied in a DLP projector according to the present disclosure. The region 1 is 11.05 ms long. This corresponds to the duration of a half wave. The associated full wave would accordingly be 22.1 ms long. This corresponds to a frequency of 1/22.1 ms=45 Hz. A commutation occurs within the region 2. The first half wave in the region 2 is 2.9 ms long. The associated full wave would accordingly be 5.8 ms long, which corresponds to a frequency of 172 Hz. The second half wave is 2.75 ms long. The associated full wave would accordingly be 5.5 ms long, which corresponds to a frequency of 182 Hz. Accordingly, $f_1$=45 Hz and $f_2$=177 Hz using the formula as mentioned at the outset. The modulation factor is accordingly 3.93.

The mean lamp frequency may be calculated in that the total duration of the two regions is determined and it is taken into consideration that a total of three commutations occur in this case. The three half waves accordingly require a duration of 2.9 ms+2.75 ms+11.05 ms=16.7 ms. The mean period duration T may then be specified as T=16.7 ms/1.5=11.1 ms and the mean frequency f may be specified as f=1/T=90 Hz. The first region is thus the chronologically longest region, which has no commutation, while in contrast the second region is chronologically shorter and has a commutation. The first region is therefore the region of the repeating current waveform having the longest half wave.

FIG. 6 shows the time curve of the mean arc voltage over the service life of an ensemble of ten discharge lamps in the case of activation of the respective discharge lamp using a current waveform according to FIG. 4 according to the related art (dashed line) and using a current waveform according to the present disclosure according to FIG. 5 (solid line). As can be clearly seen, the arc voltage rises in the case of activation using a current waveform according to the present disclosure more slowly over the service life than in the case of activation of the discharge lamp using a current waveform known from the related art, and therefore causes a reduced tendency to burn back in the case of a current waveform according to the present disclosure.

FIG. 7 shows the time curve of the mean so-called maintenance of an ensemble of respectively ten discharge lamps. The maintenance is the light current (Y axis), which is measured in the visible range through a rectangular aperture of the size 5.0 mm×3.8 mm using V(λ) filter, which is scaled to the initial light current and is plotted over the time t (=burning duration of the discharge lamp; X axis). The curve of discharge lamps operated using a current waveform according to FIG. 4 is again shown by a dashed line, while the curve of discharge lamps operated using a current waveform according to the present disclosure according to FIG. 5 is identified using a solid line. If the maintenance falls below a value of 50%, the lamp has thus reached the end of its service life. As can be seen, the end of service life is reached significantly later in the case of activation using a current waveform according to the present disclosure. While in the case of activation using a current waveform according to FIG. 5, the service life is approximately 1400 hours, in the case of activation using a current waveform according to FIG. 5, a service life of approximately 2600 hours is reached. This corresponds to a growth of approximately 85%.

Other embodiments of current waveforms according to the present disclosure only have one half wave in the second region. Still other embodiments of current waveforms according to the present disclosure have three and still more half waves in the second region.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A DLP (digital light processing) projector for projecting at least one image on a projection surface, comprising:
   at least one discharge lamp;
   a color wheel having a predefinable number of color segments; and
   a control device for activating the discharge lamp, wherein the control device is designed to activate the discharge lamp such that the at least one image is projected with a predefinable repletion rate onto the projection surface,
   wherein the current waveform comprises at least one first region, to which a first frequency is assigned, and a second region, to which a second frequency is assigned,
   wherein the first region is established by a first commutation and a following second commutation, wherein the second region is established by the region between the second commutation and a following first commutation, wherein further selected variable combinations of commutations occur within the second region, wherein the first frequency is calculated as:

$f_1 = 1/(2*T1)$, wherein T1 relates to the period of time between the first and the second commutation;
   wherein the second frequency is calculated as:

$$f_2 = n \Big/ \Big(2 * \sum_{i=1}^{n} T_i\Big),$$

wherein $T_i$ relates to the periods of time from one further commutation to the next further commutation within the second region and n denotes the number of such periods of time within the second region;
   wherein a modulation factor is defined by the ratio of second frequency to first frequency,
   wherein the modulation factor is at least 3, and
   wherein a current strength is modulated within a half wave.

2. The DLP projector as claimed in claim 1, wherein the modulation factor is at most 8.

3. The DLP projector as claimed in claim 1, wherein a mean value of the first and the second frequency is between 30 Hz and 270 Hz.

4. The DLP projector as claimed in claim 1, wherein the first region is 5 ms-25 ms long.

5. The DLP projector as claimed in claim 1, wherein the first region is 8 ms-20 ms long.

6. The DLP projector as claimed in claim 1, wherein the control device is furthermore designed to activate the discharge lamp using the current waveform which comprises at least one current increase to implement a maintenance pulse, wherein the maintenance pulse is located at the end of the first region.

7. The DLP projector as claimed in claim 1, characterized in that the DLP projector furthermore comprises a power determination device, which is designed to determine a value correlated with the power implemented in the discharge lamp, wherein the power determination device is coupled to the control device, wherein the control device is furthermore designed, if it is established that the value correlated with the power implemented in the discharge lamp falls below a predefinable threshold value, to modify the current waveform such that the modulation factor is reduced.

8. A DLP (digital light processing) projector for projecting at least one image on a projection surface, comprising:
   at least one discharge lamp;
   a color wheel having a predefinable number of color segments; and
   a control device for activating the discharge lamp, wherein the control device is designed to activate the discharge lamp such that the at least one image is projected with a predefinable repetition rate onto the projection surface, wherein a current waveform comprises at least one first region, to which a first frequency is assigned, and a second region, to which a second frequency is assigned,
   wherein the first region is established by a first commutation and a following second commutation, wherein the second region is established by the region between the second commutation and a following first commutation, wherein further commutations can occur within the second region, wherein the first frequency is calculated as:

$f_1 = 1/(2*T1)$, wherein T1 relates to the period of time between the first and the second commutation;
wherein the second frequency is calculated as:

$$f_2 = n \Big/ \left(2 * \sum_{i=1}^{n} T_i\right),$$

wherein $T_i$ relates to the periods of time from one further commutation to the next further commutation within the second region and n denotes the number of such periods of time within the second region;
wherein a modulation factor is defined by the ratio of second frequency to first frequency,
wherein the DLP projector furthermore comprises a voltage measuring device, which is designed to determine a value correlated with the arc voltage of the discharge lamp, wherein the control device is coupled to the voltage measuring device, wherein the control device is designed, if it is established that the value correlated with the arc voltage falls below a predefinable threshold value, to modify the current waveform such that the modulation factor is at most 2.5.

9. A method for projecting at least one image on a projection surface by means of a DLP (digital light processing) projector, which comprises at least one discharge lamp, a color wheel having a predefinable number of color segments and a control device for activating the discharge lamp, wherein the control device is designed to activate the discharge lamp such that the at least one image is projected with a predefinable repetition rate on the projection surface, wherein a current waveform comprises at least one first region, to which a first frequency is assigned, and a second region, to which a second frequency is assigned, wherein the first region is established by a first commutation and a following second commutation, wherein the second region is established by the region between a second commutation and a following first commutation, wherein further selected variable combinations of commutations occur within the second region, wherein the first frequency is calculated as:

$$f_1 = 1/(2*T1),$$

wherein T1 relates to the period of time between the first and the second commutation;
wherein the second frequency is calculated as:

$$f_2 = n \Big/ \left(2 * \sum_{i=1}^{n} T_i\right),$$

wherein $T_i$ relates to the periods of time from one further commutation to the next further commutation within the second region and n denotes the number of such periods of time within the second region;
wherein a modulation factor is defined by the ratio of second frequency to first frequency,
the method comprising:
activating the discharge lamp using a current waveform, the modulation factor of which is at least 3,
modulating a current strength within a half wave.

* * * * *